United States Patent

Sjodin

[11] Patent Number: 5,279,497
[45] Date of Patent: Jan. 18, 1994

[54] RADIAL SLIDING-CONTACT BEARING FOR ROTARY ROLLS

[76] Inventor: Sven-Erik Sjodin, Dalkarrsleden 37, S-162 24 Vallingby, Sweden

[21] Appl. No.: 969,287
[22] PCT Filed: May 17, 1991
[86] PCT No.: PCT/SE91/00353
§ 371 Date: Jan. 14, 1993
§ 102(e) Date: Jan. 14, 1993
[87] PCT Pub. No.: WO91/18217
PCT Pub. Date: Nov. 28, 1991

[30] Foreign Application Priority Data

May 17, 1990 [SE] Sweden ............... 9001791

[51] Int. Cl.⁵ .............. F16C 33/10; F16C 32/06
[52] U.S. Cl. ................... 384/373; 384/100; 384/115
[58] Field of Search .......... 384/100, 114, 115, 373, 384/398, 292, 118, 286

[56] References Cited

U.S. PATENT DOCUMENTS

| | | | |
|---|---|---|---|
| 3,386,149 | 6/1968 | Robertson | 29/116 |
| 3,610,146 | 10/1971 | Willmott | 384/114 X |
| 4,295,690 | 10/1981 | Rutz | 384/100 |
| 4,558,960 | 12/1985 | Lehtinen et al. | 384/373 |
| 4,710,035 | 12/1987 | Vaughn | 384/115 |
| 5,069,558 | 12/1991 | Dinnebier et al. | 384/115 |

FOREIGN PATENT DOCUMENTS 146718 8/1982 Norway.

*Primary Examiner*—Thomas R. Hannon
*Attorney, Agent, or Firm*—Limbach & Limbach

[57] ABSTRACT

A radial sliding-contact bearing for rotary rolls has a cylindric fixed inner portion (2), a sleeve (4) rotatable thereon, and a gap (6) between the sleeve and the inner portion intended for a water film which in operation forms a rotary bearing for the sleeve. On its peripheral surface the inner portion has recesses (8') for facilitating an even distribution of the water over the surface of the inner portion (2) in operation. The water is fed to the gap (6) through first and second longitudinal rows of nozzle openings (14, 16) in the peripheral surface of the inner portion (2), which are connected to a common water supply channel (18) in the inner of the inner portion. As seen in the rotational direction of the sleeve, the nozzle openings, more particularly, end in the periphery of the inner portion before and behind, respectively, a longitudinal surface groove (8') in the upper side of the inner portion, said surface groove (8') serving for conveying on water coming from the first row of openings (14) and forming part of said recesses. The openings (16) in the second row, which is located before the area of the horizontal radial plane of the sleeve, have a water outlet direction (26) with a not unessential resultant in said rotational direction (24).

4 Claims, 1 Drawing Sheet

RADIAL SLIDING-CONTACT BEARING FOR ROTARY ROLLS

TECHNICAL AREA

The present invention relates to a radial sliding contact bearing for rotary rolls, with a cylindric fixed inner portion, a sleeve rotatable thereon, and a gap intended for a fluid film arranged between the sleeve and the inner portion, said film in operation forming a rotational bearing for the sleeve, the fluid being delivered to the gap through first and second longitudinal rows of nozzle openings in the peripheral surface of the inner portion, said rows being arranged on each its side of a vertical diametrical plane through the inner portion.

PRIOR ART

A bearing of this kind is known through U.S. Pat. No. 4,558,960. This bearing is practically used in a roll assembly with curved roll intended to be used e.g. as a transport roll or treatment roll within the paper or textile industry. The roll is assembled from sleeve modules connected together end-to-end sealingly and torque transmitting, said modules consisting of rotatable sleeves of the kind defined by way of introduction. This roll rotates about a fixed shaft assembled from cylindric modules arranged end to end and consisting of inner portions of the kind likewise defined by way of introduction, each sleeve then rotating around a corresponding cylindric module. More particularly, the cylindric modules/inner portions have somewhat inclined end surfaces and are arranged end to end with the end surfaces suitably orientated to give the roll the desired curved shape. A steel rod passing through the cylindric modules is tensioned and attached at the ends for obtaining a rigid shaft body.

The said recesses in the peripheral surface of the inner portion include a number of axially extending surface grooves distributed around the periphery of the shaft body, and transverse grooves connecting together said surface grooves, as well as trapezoidally shaped shallow pockets which at their broader base pass over into the longitudinal grooves. Water for the water film appearing during operation is delivered at one end of the longitudinal grooves and is withdrawn at the other one.

Although the introduction of radial bearings and rolls of the described type meant an improvement within the art in a number of respects, some disadvantages have also been noted in practice. Due the absence of a water film between the upper bearing surfaces during standing still of the bearing the roll has thus turned out to be very slow and power demanding at start. Also in operation seemingly unwarranted increases of the power demand and unexplainable wear of portions of the bearing surfaces have appeared.

Through U.S. Pat. No. 3,386,149 a radial bearing for rotating rolls is known, in which two rows of radially directed openings extend through the wall of a tube shaped fixed shaft on equal distances from the vertical central line through the shaft. On this shaft the roll is arranged as a rotatable sleeve. A liquid under pressure is introduced through the tube shaped shaft to the radial openings and out into gap between the shaft and the sleeve. The radial liquid jets flowing out through the openings in the gap are stated to form two lines of support for the sleeve in order to facilitate starting of the sleeve from standing still and as a support against an applied load in the form of a web transported over the sleeve.

THE INVENTION

The object of the present invention is to provide a bearing requiring less power than thus far both at start and during operation.

According to the invention this object is attained in that, at a bearing of the kind defined by a way of introduction, the two rows of nozzle openings communicate with each other via a common fluid delivery channel in the inner of the inner portion, the openings of the first row are so located with respect to the vertical diametrical plane that, on the one hand, at start, fluid flowing out through these into the gap lifts the sleeve from the inner portion, and on the other hand, due to tangential forces appearing during start and in operation, said first openings will be choked by the rotatable sleeve resulting in a fluid increase at the openings of the second row, the openings in the second row, which is located before the area of the horizontal radial plane of the sleeve, have a fluid outlet direction with a not unessential resultant in the rotational direction, so that fluid flowing out therefrom due to said fluid pressure increase counteracts tilting movement of the sleeve against the inner portion provoked by a force of reaction appearing due to said tangential force, the two opening rows furthermore being so arranged with respect to each other that in operation the tangential force and its force of reaction are kept in a dynamic balance and thereby frictional forces between the sleeve and the inner portion are minimized.

At start the direct water supply under pressure through the nozzle rows along the full length of the roll lifts the roll assembled from the sleeves without delay from the fixed shaft assembled from the cylindric inner portions so that the roll can be started with a very small starting power as compared with that possible with a roll with a bearing according to U.S. Pat. No. 4,558,960. Furthermore, however, also a conspicuous and unexpectedly great decrease of the required power during operation of the roll is obtained. As an example it can be mentioned that where a roll assembly with a bearing according to U.S. Pat. No. 4,558,960 requires a power of 18 kW at a roll speed of 1000 n/m, the same assembly modified with a bearing arrangement in accordance to the invention has turned out to require a power of only 4 kW at the same speed.

A likely model of explanation is that at the known roll assembly the tangential forces appearing due to a load tend primarily to press the sleeve against the inner portion within a first area of the latter located before the vertical radial plane thereof. As a reaction on this force action the sleeve is subjected to a tilting movement which despite the water film brings it to a friction increasing contact with the inner portion within a second area of the inner portion located behind the vertical radial plane essentially in the vicinity of the horizontal radial plane of the inner portion. Investigations of the wear pattern afterwards in a radial bearing according to U.S. Pat. No. 4,558,960 have shown wear primarily in the second area.

In the bearing according to the invention the first opening row is located in the first area and the second opening row before the second area. When the sleeve, due to the tangential forces in accordance with the above is pressed in a direction against the first area the gap over the first openings is decreased which thereby become a tendency to be choked. Since the two opening rows communicate, the pressure at the second openings is increased and a greater flow of water flows out there in a direction towards the second area due to the slope of these openings in a direction thereto. This greater flow of water counteracts the above discussed tilting movement of the sleeve to such a degree that the sleeve does not come into friction increasing with the inner portion within the second area. In operation there is balance between the pressure at the two opening rows, the first opening row then essentially only having as its function to feed water to the water film of the radial bearing and the second opening row essentially only having a controlling function on the movement of the sleeve.

DESCRIPTION OF THE FIGURES

An embodiment of the invention shall now be described more closely with reference to the attached drawings, on which FIG. 1 in perspective shows the cylindric inner portion of the radial bearing according to the invention.

PREFERRED EMBODIMENT

Figure 1:
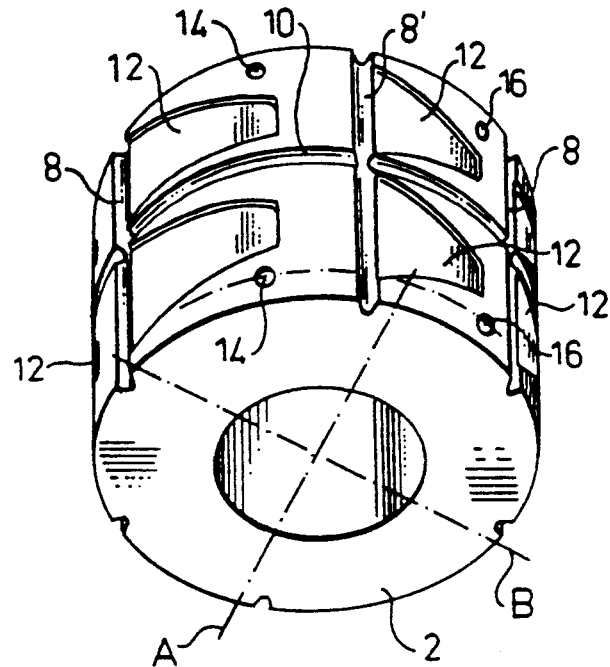

The radial sliding-contact bearing according to the invention illustrated on the drawing, of which mainly only essential portions are shown on the drawing, has a cylindric fixed inner portion 2. On the inner portion 2 a sleeve 4 (left out in FIG. 1 for the sake of clearness) is rotatably arranged. Between the sleeve 4 and the inner portion 2 there is a gap 6 intended for a water film which in operation forms a rotational bearing for the sleeve. The inner portion on its peripheral surface has recesses which shall facilitate an even distribution of the water over the surface of the inner portion during operation. The recesses can include a number of axially extending surface grooves 8 distributed around the periphery of the shaft body, and transverse grooves 10 connecting together said surface grooves, as well as trapezoidally shaped shallow pockets 12 which at their broader base passes over into the longitudinal grooves 8.

The details of the bearing described thus far correspond to corresponding details of the bearing according to U.S. Pat. No. 4,558,960.

Contrary to this known bearing, however, water is fed to the gap 6 through first and second longitudinal rows of nozzle openings 14 and 16, respectively, in the peripheral surface of the inner portion 2, which are connected to a common water supply channel 18 in the inner of the inner portion through channels 20 and 22, respectively. For relating the location of the nozzle openings to the system of recesses 8, 10, 12 in the peripheral surface of the inner portion, vertical and horizontal radial planes in an imagined operational position of the bearing have been indicated in the Figures with dashed lines A and B, respectively. As seen in the rotational direction of the sleeve, designated 24 in FIG. 1, the openings 14 and 16, respectively, in the periphery of the inner portion end before and behind, respectively, one of the longitudinal surface grooves, here designated 8, for the sake of clearness. The openings 16 in the second row are generally located before the area of the horizontal radial plane B of the sleeve - more particularly before the next longitudinal surface groove 8 in the embodiment shown. The channels 22 and thereby the water outlet direction of the openings 16, indicated with an arrow 26 in FIG. 2, extend under a direction with a not unessential resultant in the rotational direction 24, i.e. the direction 26 deviates considerably from an imagined radius passing through the opening 16.

In the described bearing according to the invention the row of openings 14 is located in a first area of the inner portion 2, against which the sleeve 4 in operation has a tendency to come into contact under the influence of tangential forces provoked by the rotation of the sleeve 4. The row of the openings 16 is located before a second area of the inner portion 2, against which the sleeve 4 as a reaction to the just mentioned movement of the sleeve has a tendency to tilt. In FIG. I the second area may be imagined to be located generally between two surface grooves 8 following after the groove 8,, and in any case before the horizontal radial plane B. When the sleeve due to the tangential forces in accordance with the above is pressed in a direction against the first surface area the gap over the openings 14 is decreased, said openings thereby becoming a tendency to be choked. Since the two opening rows communicate via the channels 20, 22 the pressure is increased at the openings 16 and a greater water flow there flows out into the gap 6 in the direction 26 towards the above mentioned second area. This greater flow of water counteracts the above discussed tilting movement of the sleeve 4 to such a degree that the sleeve does not come into friction increasing contact with the inner portion 2 within the second surface area. In operation there is a balance between the pressures at the two opening rows, the first opening row 14 essentially only having as its function to feed water to the water film of the radial bearing and the second opening row 16 essentially only having a controlling function on the movement of the sleeve 4.

Figure 2:
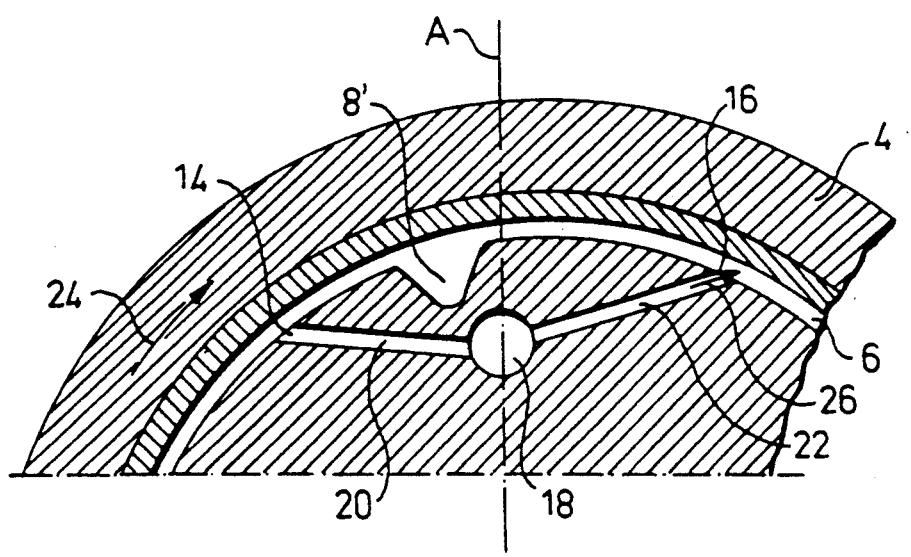
FIG. 2 shows a portion of a radial section along the dashed doted line II in FIG. 1, an associated portion of a sleeve rotating around the inner portion being also shown.

In a way conventional per se the bearing according to the invention can be used at a roll assembly with a curved roll intended to be used e.g. as a transport roll or treatment roll within the paper or textile industry. The roll is assembled by end-to-end sealingly and torque transferring connected sleeve modules, consisting of the sleeves 4. This roll rotates about a fixed shaft assembled from cylindrical modules arranged end-to-end, consisting of the inner portions 2, each sleeve 4 then rotating around a corresponding cylindrical module 2. More particularly, the cylindric modules/inner portions 2 have somewhat inclined end surfaces and are arranged end-to-end with the end surfaces suitably orientated for imparting to the roll the desired curved shape. A steel rod passing through the cylindric modules is tensioned and attached at the ends so as to obtain a rigid shaft body. For making possible the said orientation of the inner portions 2 a pair of hole rows 14 and 16, respectively, can exist in association with every second one of the surface grooves 8, only one such pair at the time then, of course, acting during operation, i.e. the pair which for the time being, depending upon the actual orientation of the inner portion, is located in association with the upper side of the inner portion 2, as is shown in FIG. 2.

For making possible reversed rotational direction, should the need occur, the two rows of openings 14 and 16, respectively, can be located essentially mirror like with respect to the surface groove 8'.

We claim:

1. Radial sliding-contact bearing for rotary rolls, with a cylindric fixed inner portion (2), a sleeve (4) rotatable thereon, and a gap (6) intended for a fluid film arranged between the sleeve and the inner portion, said film in operation forming a rotational bearing for the sleeve, the fluid being delivered to the gap (6) through first and second longitudinal rows of nozzle openings (14,16) in the peripheral surface of the inner portion (2), said rows being arranged on each its side of a vertical diametrical plane (A) through the inner portion, characterized in that the two rows (14,16) of nozzle openings communicate with each other via a common fluid delivery channel (18) in the inner of the inner portion (2), the openings of the first row (14) are so located with respect to the vertical diametrical plane that, on the one hand, at start, fluid flowing out through these into the gap (6) lifts the sleeve (4) from the inner portion (2), and on the other hand, due to tangential forces appearing during start and in operation, said first openings (14) will be choked by the rotatable sleeve (4) resulting in a fluid increase at the openings of the second row, the openings (16) in the second row, which is located before the area of the horizontal radial plane (B) of the sleeve, have a fluid outlet direction (26) with a not unessential resultant in the rotational direction, so that fluid flowing out therefrom due to said fluid pressure increase counteracts tilting movement of the sleeve against the inner portion provoked by a force of reaction appearing due to said tangential force, and the two opening rows (14,16) furthermore being so arranged with respect to each other that in operation the tangential force and its force of reaction are kept in a dynamic balance and thereby frictional forces between the sleeve (4) and the inner portion (2) are minimized.

2. Radial sliding-contact bearing according to claim 1, characterized in that the first and second longitudinal rows of nozzle openings (14 and 16, respectively) end, as seen in the rotational direction of the sleeve, in the periphery of the inner portion before and behind, respectively, of a longitudinal surface groove (8') in the upper side of the inner portion, said surface groove (8') serving for conveying on fluid coming from the first row of openings (14) and forms part of recesses (8,10,12) in the surface of the inner portion arranged for the same purpose.

3. Radial sliding-contact bearing according to claim 2, characterized in that, for making possible reversed rotational direction if desired, the two rows of openings (14, 16) are located essentially mirror like with respect to the surface groove (8').

4. Radial sliding-contact bearing according to claim 2 or 3, characterized in that the inner portion (2) around its periphery has at least two sets of first and second nozzle openings (14 and 16, respectively) in association with a corresponding longitudinal surface groove (8').

* * * * *